Nov. 23, 1926.

W. J. THOMPSON 1,607,970

MOLD FOR MAKING PARTICOLORED BLOCKS OF ICE CREAM

Filed August 6, 1923

Inventor
W. J. Thompson
by
Attys.

Patented Nov. 23, 1926.

1,607,970

UNITED STATES PATENT OFFICE.

WILLIAM JOSEPH THOMPSON, OF SOUTH MELBOURNE, VICTORIA, AUSTRALIA.

MOLD FOR MAKING PARTICOLORED BLOCKS OF ICE CREAM.

Application filed August 6, 1923, Serial No. 656,069, and in Australia June 18, 1923.

My invention relates to the manufacture of blocks of parti-colored ice cream or water ices and to the mold in which the blocks are frozen.

One way in which ice cream has been hitherto frozen has consisted in filling the cream into a mold with a stirrup and which is then placed in a brine tank to freeze the cream. On removal from the tank the mold is dipped into warm water after which the frozen block can be withdrawn on the stirrup and parted into the required sizes for packing.

This invention has for its object the manufacture in a mold of hollow blocks of frozen material, such as cream, in such a way that the centre of the block, which at present is the last part to freeze, will be frozen at or about the same time as the outer parts. Having withdrawn the hollow block from the mold, its centre will be filled with cream of assorted flavors and various colors, if more than one hollow part be left in the block, and left to stand until frozen as a whole block, before being pated up for packing and sale. A specially designed stirrup is used for withdrawing the hollow block of frozen cream.

In the accompanying drawing—

Figures 1, 2:
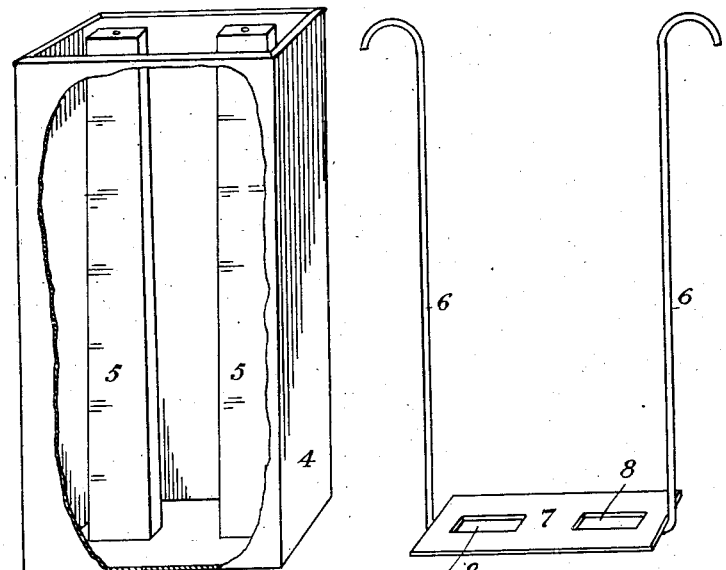
Fig. 1 is a perspective view of the mold and brine ways.
Fig. 2 is a like view of the stirrup.
Figure 3:
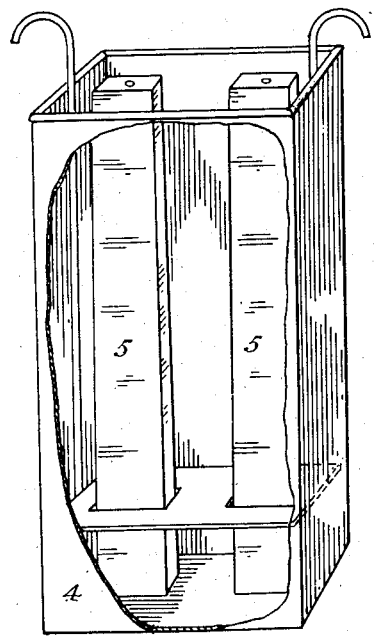
Fig 3 shows the stirrup in the mold, partly lifted therein.

The mold 4 is of the usual rectangular form but its floor is partly removed to enable the brine ways 5 to be secured thereto over the openings. These ways extend up to or nearly to the lip of the mold and are provided at the top with a small air vent. They may, if desired, be made slightly taper, being a little narrower at the top than the bottom.

The stirrup is made of about wire sides 6 and a transverse plate 7 to which the wires are securely attached at their lower ends. In the plate are openings 8 to correspond with the shape, size and position of the brine ways 5 over which the plate is placed before being lowered into the mold and which is done before filling the cream thereinto.

On the mold being placed in the brine the latter will rise in the ways 5 and assist in more quickly freezing the material.

To withdraw the frozen block from the mold same is first dipped into warm water, which enters the parts 5, after which the stirrup is withdrawn with the block of cream on the plate 7.

The hollows left in the block are filled with materials, such as fruit flavored cream or other fillings and each may vary in color and flavor.

Thus, by means of the invention, I am able to make parti-colored blocks of cream with variously flavored fillings, and to more quickly freeze the block from which the small pieces are afterwards cut and wrapped for sale.

Having now described my invention what I claim as new and desire to secure by Letters Patent is—

In the manufacture of parti-colored blocks of ice cream, in combination, a mold into which cream can be filled for freezing in a brine tank, at least one brine way therein, open at the bottom to the tank, and at the top to the atmosphere, a stirrup adapted loosely to fit the mold, having a transverse member provided with an aperture shaped to pass over said brine way, said transverse member serving as a support for the frozen block when removed from said tank, the aperture therein registering with the hollow in the block left by the withdrawal of the brine way.

In testimony whereof I have signed my name to this specification.

WILLIAM JOSEPH THOMPSON.